(12) United States Patent
Drewes

(10) Patent No.: US 10,704,622 B2
(45) Date of Patent: Jul. 7, 2020

(54) ACTUATION MECHANISM FOR A BRAKE

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 50 days.

(21) Appl. No.: 15/779,403

(22) PCT Filed: Oct. 24, 2016

(86) PCT No.: PCT/EP2016/075506
§ 371 (c)(1),
(2) Date: May 25, 2018

(87) PCT Pub. No.: WO2017/089050
PCT Pub. Date: Jun. 1, 2017

(65) Prior Publication Data
US 2018/0306254 A1    Oct. 25, 2018

(30) Foreign Application Priority Data

Nov. 25, 2015   (DE) .................. 10 2015 120 375

(51) Int. Cl.
| | |
|---|---|
| *F16D 51/24* | (2006.01) |
| *B60T 13/58* | (2006.01) |
| *F16D 65/22* | (2006.01) |
| *F16D 125/66* | (2012.01) |
| *F16D 121/02* | (2012.01) |

(52) U.S. Cl.
CPC ............ *F16D 51/24* (2013.01); *B60T 13/583* (2013.01); *F16D 65/22* (2013.01); *F16D 2121/02* (2013.01); *F16D 2125/66* (2013.01)

(58) Field of Classification Search
CPC ...... F16D 51/24; F16D 65/22; F16D 2121/06; F16D 2121/08; F16D 2121/10; F16D 2121/12; F16D 2125/66
USPC ......................................... 188/152, 344, 343
See application file for complete search history.

(56) References Cited

U.S. PATENT DOCUMENTS

| | | |
|---|---|---|
| 1,968,667 A | 7/1934 | White |
| 2,162,775 A | 6/1939 | Dick |
| 2,501,578 A | 3/1950 | Pointer |

(Continued)

FOREIGN PATENT DOCUMENTS

| | | |
|---|---|---|
| BE | 567857 | 6/1958 |
| DE | 1158851 | 12/1963 |

(Continued)

OTHER PUBLICATIONS

European Patent Office; International Search Report; dated Jan. 17, 2107; all pages.

(Continued)

*Primary Examiner* — Thomas W Irvin
(74) *Attorney, Agent, or Firm* — Price Heneveld LLP

(57) ABSTRACT

Actuation mechanism for a wedge-actuated drum brake, in particular for commercial vehicles, includes a spreading unit which has an actuating element which is displaceable along an actuating direction, wherein the spreading unit is configured in such a way that the displacement of the actuating element can occur directly via a fluid or a fluid pressure.

16 Claims, 1 Drawing Sheet

(56) References Cited

U.S. PATENT DOCUMENTS

| | | | |
|---|---|---|---|
| 3,176,467 A | 4/1965 | Van House | |
| 3,269,272 A | 8/1966 | Rager et al. | |
| 3,338,337 A * | 8/1967 | Freeland | B62L 3/023 |
| | | | 188/344 |
| 3,485,537 A | 12/1969 | Schlor et al. | |
| 3,612,228 A * | 10/1971 | Rick | B60R 25/08 |
| | | | 188/106 P |
| 3,837,443 A | 9/1974 | Clemmons et al. | |
| 3,899,057 A * | 8/1975 | Carre | B60T 11/16 |
| | | | 188/351 |
| 4,323,144 A | 4/1982 | Morris et al. | |
| 4,887,697 A * | 12/1989 | Micke | F16D 65/22 |
| | | | 188/79.62 |
| 5,064,034 A * | 11/1991 | Rupprecht | F16D 65/22 |
| | | | 188/343 |
| 5,368,136 A * | 11/1994 | Walte | B62L 1/14 |
| | | | 188/2 D |
| 6,615,955 B2 * | 9/2003 | Jakovljevic | B60T 1/04 |
| | | | 188/24.14 |
| 6,749,271 B1 | 6/2004 | Mayr-Fröhlich et al. | |
| 2002/0185349 A1 * | 12/2002 | Jakovljevic | B60T 1/04 |
| | | | 188/344 |
| 2003/0164272 A1 * | 9/2003 | Chun | F16D 65/22 |
| | | | 188/343 |
| 2016/0039492 A1 * | 2/2016 | Watarai | B62L 3/023 |
| | | | 280/281.1 |

FOREIGN PATENT DOCUMENTS

| | | |
|---|---|---|
| DE | 1897280 | 7/1964 |
| DE | 1951780 | 9/1966 |
| DE | 1555224 | 3/1972 |
| DE | 2453966 | 6/1975 |
| DE | 4444841 | 6/1996 |
| DE | 102004058901 | 6/2006 |
| DE | 102013215850 | 2/2015 |
| FR | 2878921 | 6/2006 |
| GB | 516951 | 1/1940 |
| GB | 524972 | 8/1940 |
| GB | 542885 | 1/1942 |

OTHER PUBLICATIONS

N.N.: Das (!) Hydrair-Einkammer-Bremsverstärker GL-624, Internetbeitrag vom Mar. 27, 1998, abgerufen am Aug. 2, 2016, https://user.inberlin.de/~salier/rep/hydrair.html.

* cited by examiner

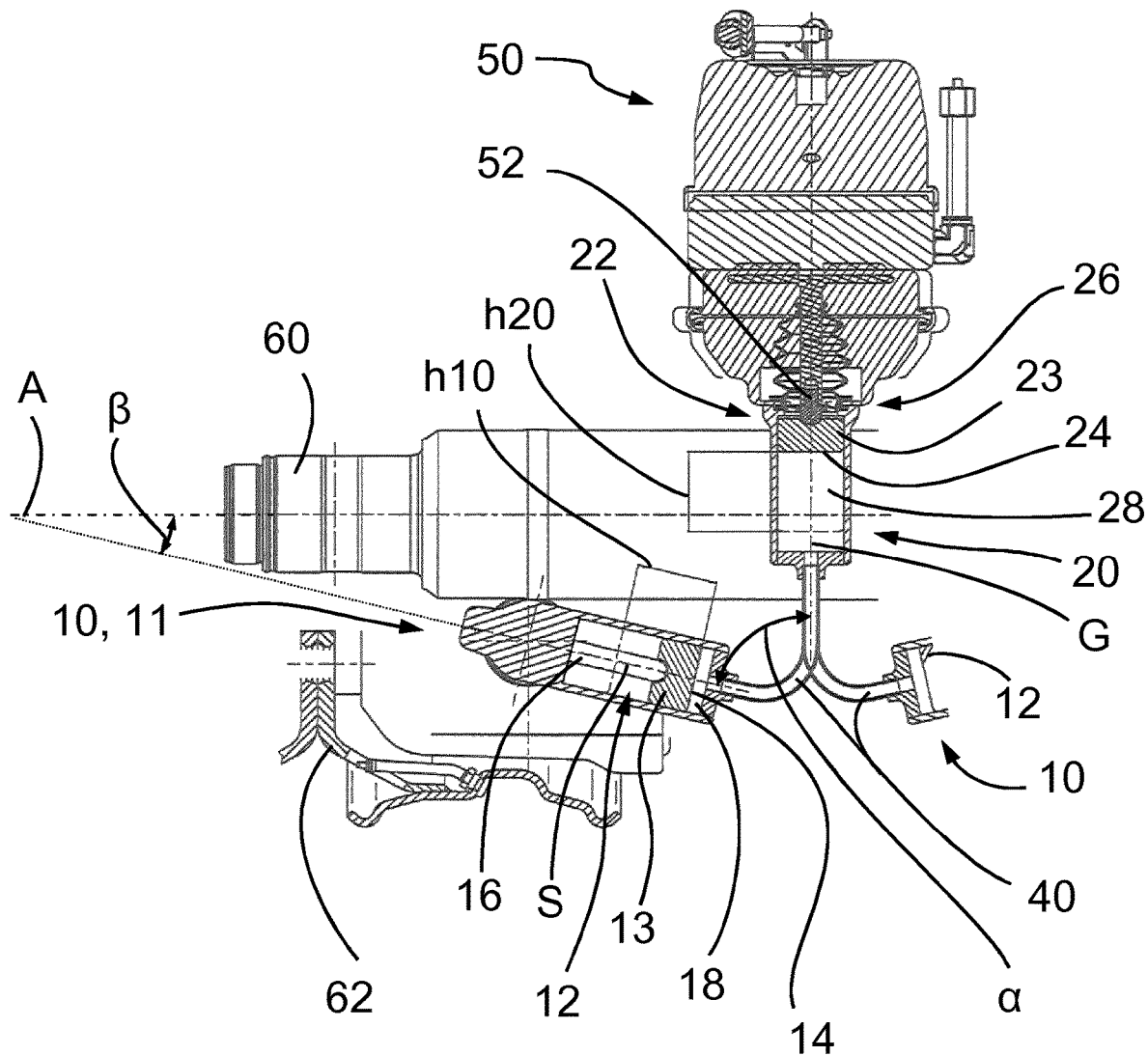

ACTUATION MECHANISM FOR A BRAKE

BACKGROUND OF THE INVENTION

The invention relates to an actuation mechanism for a wedge-actuated drum brake, in particular for commercial vehicles, to a wedge-actuated drum brake and to an actuation system for wedge-actuated drum brakes.

Drum brakes for commercial vehicles are known in the prior art. They customarily comprise an actuator unit which can be formed by a pneumatically or hydraulically operated brake cylinder, an actuating unit/spreading unit for displacing a brake element which is equipped with a brake lining, and a transmission unit for transmitting a force from the actuator unit to the actuating unit. In the case of wedge-actuated drum brakes, a brake lining carrier having a brake lining mounted thereon is displaced radially outward and pressed against the inner face of a rotating brake drum by a wedge-shaped, longitudinally displaceable actuating element. Here, depending on the existing space, the axis formed by the wedge with the brake cylinder extends either parallel or obliquely to the axis of the wheel to be braked. The transmission element arranged between the brake cylinder and the actuating element can be dimensioned such that, depending on the existing structural frame, the brake cylinder is arranged at a favorable position. The dimensioning of the brake cylinder means that the installation of such an actuation mechanism in certain assemblies which have only a limited clearance is barely possible, if at all. It is known from DE 10 2013 215 850 A1, for example, to solve such installation problems by providing a deflection device which deflects the force to be transmitted from an actuator unit to the actuating element from a first into a second direction. This change of direction is intended to make possible different positionings, in particular of the actuator unit. However, it is problematic here that mechanical deflection systems of this type are relatively difficult to construct and the spreading units used here require an additional and/or solid fastening to the axle in order to absorb the vibrations and accelerations (unsprung masses). Furthermore, a separate brake cylinder is required for each brake unit, which can lead to space problems in particular in the case of swing axles.

It is therefore an object of the present invention to provide an actuation mechanism, a wedge-actuated drum brake and an actuation system whereby the aforementioned problems can be eliminated.

SUMMARY OF THE INVENTION

According to the invention, an actuation mechanism for a wedge-actuated drum brake, in particular for commercial vehicles, comprises a spreading unit which has an actuating element which is displaceable along an actuating direction, wherein the spreading unit is configured in such a way that the displacement of the actuating element can occur directly via a fluid or a fluid pressure. Unlike in the passenger car sector where an actuator unit or a brake cylinder is situated directly within the brake drum in order to actuate the brake shoes, a customary configuration employed in commercial vehicles is one in which an extra structural unit is arranged within the brake drum for actuation, for example an S cam or, in the case of the actuated-wedge drum brake, a corresponding spreading unit. In this regard, it is the case in the prior art that the corresponding brake cylinder/the actuator unit is seated outside of the brake drum and is mechanically connected to the spreading unit or the actuation occurs mechanically. However, it is precisely this mechanical connection that leads to space problems since the position of the brake cylinder is predetermined by the mechanical connection. Thus, the brake cylinder is seated either in the extension of an actuating direction of a wedge or, if a mechanical deflection system is present, at a fixed, unchangeable angle to the actuating direction. Therefore, in the present case, the spreading unit or the actuating element can expediently be hydraulically actuated. According to one embodiment, the spreading unit comprises a housing which is fastened to a brake carrier of the drum brake in a form- and/or force-fitting manner. Within the housing, two movably mounted pistons which can be moved via a wedge are arranged for example along a spreading axis which extends substantially transversely to the actuating direction. Consequently, a movement of the wedge can be transmitted along the actuating direction to the pistons which then move along the spreading axis, with the result that the brake shoes can be actuated and with the result that, ultimately, the braking action can be achieved. The wedge is expediently situated at one end of a push rod, with the actuating element comprising the push rod. The fluid, which expediently acts directly on the actuating element, is for example a gaseous, in particular preferably a liquid, medium such as a (hydraulic) oil. A working chamber or a working volume is expediently formed within the housing of the spreading unit and at the same time acts as a guide for the actuating element along the actuating direction. For this purpose, an inner contour of the working chamber is expediently round, in particular circular. In other words, a cylindrical working chamber is thus expediently provided, wherein an outer wall of the working chamber is formed by the housing of the spreading unit itself. Furthermore, the spreading unit or the housing of the spreading unit expediently comprises at least one opening or at least one connection region via which the fluid can be guided into the spreading unit. Since the actuation of the actuating element now does not occur mechanically but hydraulically, it is initially unimportant where the opening or the connection or connections for introducing the fluid is/are positioned. The connection can be situated at an end side of the spreading unit. However, the connection can also be arranged for example on a lateral surface, with the result that a radial access as it were into the spreading unit is provided. The use of a fluid for actuating the actuating element thus produces an extremely large degree of variability which particularly benefits the arrangement of a master unit.

According to one embodiment, the actuation mechanism comprises a master unit which has a master element which is displaceable along a master direction, wherein the master direction relative to the actuating direction can advantageously be freely chosen by virtue of the fact that the master element and the actuating element are in direct operative connection via the fluid. The master unit is provided to build up the fluid pressure or to deliver/transport the fluid to the spreading unit or to the actuating element arranged therein. Here, the expression "operative connection" thus means that a movement of the master element by the fluid produces a movement of the actuating element. In other words, a force of the master element due to the fluid is thus transmitted to the actuating element. Here, the movement direction of the master element and the movement direction of the actuating element are exactly predetermined mechanically. However, the fluid coupling now makes it possible for the positioning of the master unit relative to the spreading unit to be able to be freely chosen. There is thus advantageously obtained a hydraulic deflection between the spreading unit and the master unit, wherein the direction of the deflection can be freely chosen.

The master unit is advantageously arranged at a remote position with respect to the spreading unit. This means that the master unit is not or does not have to be arranged on the drum brake or the spreading unit, or where appropriate not even in the vicinity thereof. It can also be fastened to the drum brake or close to the spreading unit. In principle, however, the hydraulic deflection affords the possibility of arranging the master unit (or the master units) where it appears most appropriate from package points of view. Here, the term "remote position" is not to be interpreted to the effect that the master unit has to be arranged as far away as possible. Rather, what is meant is the variability which is provided by the hydraulic deflection and which allows a flexible or variable or changeable arrangement of the master unit (or of the actuator unit), for example only a few centimeters distant from the drum brake or else further away, for example on the vehicle frame or a chassis component.

According to one embodiment, the actuation mechanism has a line element which fluidically connects the master unit and the spreading unit. This can be a known hydraulic pipe made of plastic or metal or mixtures of the aforementioned materials, said pipe being tailored to the operating pressures which occur. Such a hydraulic pipe can be bent freely to a greater or lesser extent, with the result that as it were no limits are imposed on a positioning of the master unit relative to the spreading unit. The master unit can be arranged with a forward or rearward offset in the direction of travel; relative to the road plane, it can be arranged higher or lower etc. with respect to the spreading unit/drum brake. The distance of the master unit relative to the spreading unit can also be freely chosen.

According to one embodiment, the line element is designed to be flexible at least in certain portions. This makes it possible to ensure that, even when the spreading unit and the master unit are already connected, a positioning/displaceability relative to one another is possible. The system can thus, for example, also be preassembled before it is installed since the flexibility of the linen element that is provided at least in certain portions means that a final position, for example of the master unit, can also be found when the master unit and spreading unit are already connected via the line element.

The actuating element expediently comprises an actuating piston on which the fluid pressure acts directly, wherein a piston face of the actuating piston is preferably designed to be flat or planar. Here, the piston is expediently round, in particular circular, and moves within the previously already described working chamber along the actuating direction. The already described push rod is expediently also connected to the actuating piston, with the result that the force or the movement of the fluid or of the fluid pressure is transmitted to the wedge indirectly by means of the actuating piston via the push rod. Here, the transmission of the fluid pressure advantageously occurs directly in the actuating piston without the further use of mechanical deflecting or compensating elements. This means that the movement of the actuating piston is rigidly predetermined by the geometry of the working chamber or of the housing of the spreading unit, but the actual actuation of the actuating piston, given that said actuation is caused by the fluid or by the fluid pressure, is not dependent on the actuating direction.

As already mentioned, the spreading unit expediently has a housing in which the actuating element is arranged, wherein the actuating piston is arranged within the housing. This means that the actuation of the actuating piston occurs within the housing and no movable components have to be guided outside the housing of the spreading unit. By virtue of the fact that the actuating piston and its piston face are situated within the housing, it is thus therefore possible for an extremely compact spreading unit to be realized.

According to one embodiment, the housing of the spreading unit is of substantially one-part design, wherein the housing has, for example, the shape of a substantially cylindrical hollow body.

The master element expediently comprises a master piston, wherein a piston face of the master piston preferably corresponds substantially to the piston face of the actuating piston. The master piston of the master element is preferably also a cylindrical body, for example, wherein the piston face of the master piston is round, in particular circular.

Consequently, the actuation mechanism is thus preferably configured in such a way that a displacement travel of the master piston corresponds substantially to a displacement travel of the actuating piston. What is meant in particular by this is that the lengths of the displacement travels correspond to one another or are correlated with one another.

Alternatively, the piston faces of the master piston and of the actuating piston can be dimensioned to be different if, for example, an increased braking force is to be achieved. In this case, a piston face of the actuating piston is expediently designed to be larger than the piston face of the master piston. For example, the ratio of the piston face of the actuating piston to that of the master piston is between 1.5 to 1.1, expediently a ratio of 1.4 to 1.2. For different requirements, such as, for example, different vehicle weights, it is thus very simply possible to achieve different braking performances with one and the same spreading unit. Alternatively, the aforementioned ratios can also be reversed, that is to say for example be in a range from 0.6 to 0.9.

According to one embodiment, the actuation mechanism comprises an actuator unit which is designed to actuate the master piston or the master element, wherein the actuator unit is preferably a pneumatic actuation element, in particular a pneumatic brake cylinder. What is thus concerned in the present case is expediently a spreading unit for drum brakes, in particular for commercial vehicles, wherein the spreading unit is actuated by a pneumatic actuation cylinder/brake cylinder via a hydraulic deflection. In the case of spreading units which can be found on the market nowadays, the cylinder position is varied only by the inclination of the spreading unit (with respect to the center axis of the commercial vehicle axle) and by the rotary position of the brake itself; a 90° deflection, for example, has not been achieved to date in wedge-actuated brakes. Thus, an installation of the wedge-actuated brake in certain assemblies which have only a limited clearance for brake cylinders was often not possible and the use possibilities of wedge-actuated drum brakes were limited. However, the actuation mechanism described here precisely eliminates these disadvantages. Moreover, it is possible to achieve a very compact, lightweight and cost-optimized spreading unit which only has to have the actuating element as a movable component. The spreading unit thus does not have to bear the weight of any mechanical deflection or the weight of the actuator unit and can accordingly be configured and designed to be lightweight. Moreover, it is simply possible to use standard components of an actuation mechanism without deflection as long as it is ensured that the actuating element can be hydraulically operated. For example, the same actuator units/brake cylinders can be used as in a spreading unit without the hydraulic deflection. The purely hydraulic deflection advantageously removes the need for an external linkage which as a rule has vulnerable bearing points, reacts sensitively to external influences and thus would reduce the reliability of the brake. The spreading unit itself is expediently low-maintenance or maintenance-free. Moreover, it can be completely preassembled independently of the brake, wherein different brake sizes can easily be covered. It is thus advantageously possible for many track combinations or combinations of different distances of the links from one another to be covered.

According to one embodiment, the master unit and the actuator unit can be integrated in one another. Alternatively, these can be two separate components which are connected to one another, for example in a form- and/or force-fitting manner, via a corresponding arrangement region.

According to the invention, a drum brake, in particular for commercial vehicles, is provided which comprises a master unit, wherein the master unit is arranged at a remote position with respect to the drum brake. The drum brake is preferably a wedge-actuated drum brake, and the master unit is preferably a master unit which has the aforementioned advantages and features.

According to the invention, an actuation system for drum brakes, in particular for wedge-actuated drum brakes, comprises a master unit in which at least two actuation mechanisms of drum brakes, in particular spreading units, are connected via at least two line elements. The feature concerning the at least two line elements is to be understood to the effect that each actuation mechanism is connected to the master unit. The major advantage which results therefrom is that both actuation mechanisms/spreading units or wheel brakes or more can be simultaneously activated by an actuator unit/master unit, which not only reduces the costs but also is extremely advantageous in terms of the required installation space.

It is expedient here for the actuation system to be configured in such a way that the piston face of a master piston of the master unit corresponds substantially to a sum of the piston faces of the actuating pistons of the actuation mechanism, in particular spreading units. The master unit is preferably a master unit which has the aforementioned advantages and features. The same preferably applies with respect to the spreading unit.

Where appropriate, it is also of course possible for more than two, for example four, six, etc., actuation mechanism/spreading units to be activated by an actuator unit.

The actuation mechanism according to the invention, the drum brake or the actuation system makes it possible, in an actuation mechanism/spreading unit for (wedge-actuated) drum brakes, for the arrangement of the actuator unit to be chosen in a virtually arbitrary manner by virtue of a hydraulic deflection, with the result that an installation of the (wedge-actuated) drum brake becomes possible even in assemblies and suspension systems (swing axle assemblies, steering axles, individual wheel suspensions, portal axles, etc.) which are demanding in terms of installation space. By utilizing all degrees of freedom, the actuator unit/the brake cylinder can be arranged spatially in a virtually arbitrary manner. Furthermore, it is possible for two spreading units or wheel brakes to be simultaneously activated by an actuator unit or by a brake cylinder, with the result that the required installation space is further reduced.

Also provided according to the invention is the use of a spreading unit according to the invention in or on a wedge-actuated drum brake, wherein the aforementioned advantages and features are also intended to apply to the use.

BRIEF DESCRIPTION OF THE DRAWINGS

Further advantages and features will emerge from the following description of preferred embodiments of the actuation mechanism according to the invention, of the wedge-actuated drum brake according to the invention or of the actuation system according to the invention with reference to the appended FIGURE, in which FIG. 1 shows a longitudinal section through an embodiment of an actuation mechanism of a wedge-actuated drum brake.

DETAILED DESCRIPTION OF THE PREFERRED EMBODIMENTS

FIG. 1 shows a longitudinal section through a design form of an actuation mechanism comprising two spreading units 10 which are connected to a master unit 20 via line elements 40. The master unit 20 for its part is connected in a form- and/or force-fitting manner to an actuator unit 50 or to a brake cylinder 50, which is pneumatically operated according to a preferred embodiment, via a connection region 26. In this respect, an actuation element 52 is provided which is connected to a master piston 23 of a master element 22. The actuation element 52 transmits a movement of the actuator unit 50 or of the brake cylinder 50 along a master direction G to the master piston 23, which has a piston face 24 which is connected to a working chamber 28 of the master unit 20 or delimits the working chamber 28 at least in certain regions. Upon a movement, there thus occurs a displacement travel h20 of the master piston 23 or of the piston face 24 in the downward direction, with the result that a fluid present in the working chamber 28 or in the line elements 40 acts on an actuating piston 13 of an actuating element 12 of the spreading unit 10, or, in this case, of the two spreading units 10. Consequently, a piston face 14 of the actuating piston 13 is moved or displaced along an actuating direction S by a displacement travel h10. The actuating element 12 is arranged in a corresponding housing 11. Within the housing 11 there is formed, in a similar manner as in the master unit 20, a working chamber 18 which is accordingly increased or decreased in size during the displacement of the actuating element 12. In the embodiment illustrated here, the spreading unit 10 is supported on an axle tube 60, with an angle β being formed between an axle tube direction A and an actuating direction S of the spreading unit 10. According to different embodiments, the angle α can lie in a range from 0 to 80°, preferably in a range from approximately 20 to 60°. Between the actuating direction S and the master direction G there is further formed an angle α which can assume any desired values between 0 and 180°. In preferred embodiments, the angle lies between 20 and 160°. The large degree of variability is a major advantage which results from the hydraulic deflection. Apart from this angular variability, the master unit 20 and the spreading unit 10 can also be offset along a direction of travel. However, this is not illustrated, nor can it be seen, in this view. Additionally indicated is a wheel rim 62 which is fastened rotatably on the axle tube 60. The remaining structure of the drum brake is known from the prior art and is not further illustrated for reasons of clarity. With respect to the spreading unit 10 there can also be noted for example that a corresponding wedge is present on a left end of a push rod 16 and via which corresponding pistons for actuating the brake shoes are arranged along a spreading direction. In the present case there is illustrated not only an actuation mechanism but an entire actuation system, since here the actuator unit 50 is connected to two spreading units 10, the right spreading unit 10 being illustrated only in rudimentary fashion. In this respect, a master unit 20 is fluidically connected to two spreading units 10 via corresponding line elements 40.

LIST OF REFERENCE SIGNS

10 Spreading unit
11 Housing
12 Actuating element
13 Actuating piston
14 Piston face
16 Push rod
18 Cylinder volume/working chamber/working volume
20 Master unit
22 Master element
23 Master piston
24 Piston face
26 Arrangement region
28 Cylinder volume/working chamber/working volume
40 Line element
50 Actuator unit
52 Actuation element
60 Axle tube
  62 Wheel rim
h10 Displacement travel (actuating element)
h20 Displacement travel (master element)
G Master direction
S Actuating direction
α, β Angle

The invention claimed is:

1. A wedge-actuated drum brake, comprising:
   an actuation mechanism for the wedge-actuated drum brake, comprising:
      a spreading unit which has an actuating element which is displaceable along an actuating direction; and
      a master unit which has a master element which is displaceable along a master direction;
      wherein the spreading unit is configured such that the displacement of the actuating element occurs directly via a fluid under a fluid pressure;
      wherein the master element and the actuating element are in direct operative connection via the fluid;
      wherein the master element includes a master piston;
      wherein the actuating element comprises an actuating piston on which the fluid pressure acts directly and
      wherein a piston face of the master piston corresponds substantially to the piston face of the actuating piston.

2. The wedge-actuated drum brake as claimed in claim 1, wherein the master unit is arranged at a remote position with respect to the spreading unit.

3. The wedge-actuated drum brake as claimed in claim 2, further comprising a line element which fluidically connects the master unit and the spreading unit.

4. The wedge-actuated drum brake as claimed in claim 3, wherein the line element is flexible at least in certain portions.

5. The wedge-actuated drum brake as claimed in claim 4, wherein a piston face of the actuating piston is designed to be flat or planar.

6. The wedge-actuated drum brake as claimed in claim 5, wherein the spreading unit has a housing in which the actuating element is arranged, and wherein the actuating piston is arranged within the housing.

7. The wedge-actuated drum brake as claimed in claim 6, wherein the housing of the spreading unit is one-part.

8. The wedge-actuated drum brake as claimed in claim 7, configured such that a displacement travel of the master piston corresponds substantially to a displacement travel of the actuating piston.

9. The wedge-actuated drum brake as claimed in claim 8, comprising an actuator unit which is configured to actuate the master piston or the master element, wherein the actuator unit includes a pneumatic actuation element.

10. The wedge-actuated drum brake as claimed in claim 9, wherein the pneumatic actuation element includes a pneumatic brake cylinder.

11. The wedge-actuated drum brake as claimed in claim 1, wherein a piston face of the actuating piston is designed to be flat or planar.

12. The wedge-actuated drum brake as claimed in claim 1, wherein the spreading unit has a housing in which the actuating element is arranged, and wherein the actuating piston is arranged within the housing.

13. The wedge-actuated drum brake as claimed in claim 12, wherein the housing of the spreading unit is one-part.

14. The wedge-actuated drum brake as claimed in claim 1, configured such that a displacement travel of the master piston corresponds substantially to a displacement travel of the actuating piston.

15. The wedge-actuated drum brake as claimed in claim 1, comprising an actuator unit which is configured to actuate the master piston or the master element, wherein the actuator unit includes a pneumatic actuation element.

16. The actuation element as claimed in claim 15, wherein the pneumatic actuation element includes a pneumatic brake cylinder.

* * * * *